(12) United States Patent
Sano et al.

(10) Patent No.: US 10,374,548 B2
(45) Date of Patent: Aug. 6, 2019

(54) INSPECTION SUPPORT APPARATUS AND CONTROL METHOD THEREOF, INSPECTION SYSTEM, AND CONTROL PROGRAM

(71) Applicant: OMRON Corporation, Kyoto-shi, Kyoto (JP)

(72) Inventors: Akihiko Sano, Uji (JP); Kohei Tomita, Kyoto (JP); Tsuyoshi Takeuchi, Aso (JP); Takuya Nakai, Hirakata (JP); Akihiro Funamoto, Soraku-gun (JP)

(73) Assignee: OMRON Corporation, Kyoto-shi (JP)

( * ) Notice: Subject to any disclaimer, the term of this patent is extended or adjusted under 35 U.S.C. 154(b) by 57 days.

(21) Appl. No.: 15/787,979

(22) Filed: Oct. 19, 2017

(65) Prior Publication Data

US 2018/0167029 A1 Jun. 14, 2018

(30) Foreign Application Priority Data

Dec. 9, 2016 (JP) .................................. 2016-239886

(51) Int. Cl.
*H02S 50/10* (2014.01)
*H02S 50/00* (2014.01)

(52) U.S. Cl.
CPC .............. *H02S 50/10* (2014.12); *H02S 50/00* (2013.01)

(58) Field of Classification Search
CPC . H02S 50/00; H02S 50/10; G06F 1/26; G01R 31/026

USPC .............. 324/500, 600, 764.01, 103 R, 771, 324/761.01, 501, 639, 642, 702, 76.11, 324/76.66, 96
See application file for complete search history.

(56) References Cited

U.S. PATENT DOCUMENTS

| | | | |
|---|---|---|---|
| 2014/0327408 A1* | 11/2014 | Ishii | B60L 11/123 320/135 |
| 2015/0094967 A1* | 4/2015 | Kouno | H02S 50/00 702/58 |
| 2015/0188487 A1 | 7/2015 | Yoshidomi et al. | |

FOREIGN PATENT DOCUMENTS

| | | |
|---|---|---|
| JP | 2014-011427 A | 1/2014 |
| JP | 2016-050783 A | 4/2016 |
| JP | 2016-093039 A | 5/2016 |

OTHER PUBLICATIONS

Extended European search report dated Jan. 17, 2018 in a counterpart European patent application.

* cited by examiner

*Primary Examiner* — Melissa J Koval
*Assistant Examiner* — Trung Nguyen
(74) *Attorney, Agent, or Firm* — Metrolex IP Law Group, PLLC (57) ABSTRACT

A storage unit stores a defect correlation table indicating what influence a given type of defect will have on the inspection of the other types of defects. When an obtainment unit obtains an inspection result of inspecting for a defect, an influence determination unit refers to the defect correlation table and determines the influence of the other types of defects on the inspection result. Information pertaining to the determined influence is outputted via an output unit.

18 Claims, 6 Drawing Sheets

|  |  | DEFECT OCCURRING | | | |
|---|---|---|---|---|---|
|  |  | GROUND FAULT | TOTAL DISCONNECT | MODULE DISCONNECT | BPD DISCONNECT |
| INSPECTION TARGET | GROUND FAULT |  | ×/× | ○/△ | ○/○ |
|  | TOTAL DISCONNECT | ○/△ |  | —/— | ○/○ |
|  | MODULE DISCONNECT | ○/△ | ×/× |  | ○/○ |
|  | BPD DISCONNECT | ○/△ | ×/× | ○/○ |  |
|  | OPEN VOLTAGE | ○/— | ×/— | ○/— | ○/— |

DEFECT PRESENCE/ABSENCE, DEFECT POSITION
○ : CORRECTLY DETERMINED
× : CANNOT DETERMINE
△ : DETERMINATION CONTAINS ERROR

INSPECTION SUPPORT APPARATUS AND CONTROL METHOD THEREOF, INSPECTION SYSTEM, AND CONTROL PROGRAM

CROSS-REFERENCES TO RELATED APPLICATIONS

This application claims priority to Japanese Patent Application No. 2016-239886 filed Dec. 9, 2016, the entire contents of which are incorporated herein by reference.

FIELD

The disclosure relates to an inspection support apparatus that supports inspecting a power system including a DC power source, such as a photovoltaic power generation system, for a plurality of types of defects, as well as to a control method of such an inspection support apparatus, an inspection system, and a control program.

BACKGROUND

A photovoltaic power generation system includes a solar cell string in which a plurality of solar cell modules are connected in series. Each solar cell module includes a plurality of solar cells connected in series, and a bypass diode (BPD) for bypassing the current path of the solar cells is connected in parallel to each solar cell module.

Defects may arise in such a solar cell string, such as malfunctions in solar cell modules, disconnects in cables connecting solar cell modules to each other, opening of the BPD (due to disconnects or the like), or ground faults. Thus in a photovoltaic power generation system, it is necessary to appropriately check for defects in the solar cell string to ensure a stable supply of power and to prevent accidents. The techniques disclosed in JP 2016-050783A, JP 2016-093039A, and JP 2014-011427A are known as techniques for checking for defects in a solar cell string.

A ground fault detection apparatus disclosed in JP 2016-050783A opens a negative terminal of a solar cell string and grounds a positive terminal via a detection resistance, and a voltage arising over both ends of the detection resistance at this time is detected as a first voltage. Likewise, the positive terminal of the solar cell string is opened and the negative terminal is grounded via a detection resistance, and a voltage arising over both ends of the detection resistance at this time is detected as a second voltage. Furthermore, an inter-terminal voltage between the positive terminal and the negative terminal of the solar cell string is detected.

Next, the ground fault detection apparatus finds a ground fault resistance value (insulation resistance value) of the solar cell string on the basis of the first voltage, the second voltage, the inter-terminal voltage, and the resistance value of the detection resistance. Whether or not there is a ground fault can be detected from this ground fault resistance value. Furthermore, the position of a ground fault can be detected from a ratio between the first voltage and the second voltage.

An inspection apparatus disclosed in JP 2016-093039A sequentially applies an AC inspection signal to the positive terminal and the negative terminal of a solar cell string and measures an impedance in both cases. Whether or not there is a cable disconnect or whether or not there is a defect in the solar cell module can be detected, and furthermore, the position of the cable disconnect or the position of the defective solar cell module can be detected, from the ratio between the impedance obtained when the inspection signal is applied to the positive terminal and the impedance obtained when the inspection signal is applied to the negative terminal.

A defect detection apparatus disclosed in JP 2014-011427A sends current at a prescribed current value toward the positive terminal of a solar cell string from the negative terminal of the solar cell string, measures a potential difference between the negative terminal and the positive terminal of the solar cell string, and determines whether or not a bypass diode is defective on the basis of the measured potential difference.

JP 2016-050783A (published Apr. 11, 2016), JP 2016-093039A (published May 23, 2016), and JP 2014-011427A (published Jan. 20, 2014) are examples of the background art.

SUMMARY

As described above, a plurality of types of defects may arise in a solar cell string, such as ground faults, disconnection defects, and bypass diode defects. Furthermore, a plurality of types of defects may occur simultaneously. However, neither JP 2016-050783A, nor JP 2016-093039A, nor JP 2014-011427A makes any mention of inspection in a case where a plurality of types of defects have occurred simultaneously. This is because when a plurality of types of defects occur simultaneously, measurements for determining whether or not there is a defect cannot be taken, or even if such measurements can be taken, there will be error in the measured values.

A maintenance manager with extensive experience in maintaining a photovoltaic power generation system (that is, an expert) can appropriately determine a plurality of types of defects by examining inspection results from a variety of inspection apparatuses. However, for an inexperienced user, such examination may be insufficient, and there is thus a risk that the user will erroneously determine the plurality of types of defects.

Having been achieved in light of the above-described problems, an inspection apparatus and the like that make it easy for a user to ascertain a plurality of types of defects that may be occurring may be provided.

To solve the above-described problem, an inspection support apparatus according to one aspect is an inspection support apparatus that supports inspection of a DC power source, that generates power or charges and discharges power, for a plurality of types of defects. The apparatus includes: a storage unit configured to store, for each of the plurality of types of defects, defect correlation information pertaining to influence one type of defect will have on the inspection for another type of defect; an instruction unit configured to instruct an inspection apparatus to inspect for at least one of the plurality of types of defects; an obtainment unit configured to obtain a result of inspecting for the defect from the inspection apparatus; a determination unit configured to refer to the defect correlation information in the storage unit and determine, for the inspection result of inspecting for a given type of defect obtained by the obtainment unit, the influence another type of defect will have on that inspection result; and an output unit configured to output information pertaining to the influence determined by the determination unit.

According to this configuration, the influence of another type of defect on the inspection result of inspecting for a given type of defect is determined, and information pertaining to the determined influence is outputted. By referring to the outputted information, a user can easily determine the likelihood that the given type of defect and the other type of defect have occurred. This makes it possible for the user to easily ascertain a plurality of types of defects that may have occurred.

Note that the inspection apparatus may be a single inspection apparatus, or may be a plurality of inspection apparatuses that inspect for the respective of defects.

In the inspection support apparatus according to the above-described aspect, the information pertaining to the influence may include a validity of the inspection result of inspecting for the given type of defect based on the influence of the other type of defect. In this case, the user can easily determine whether or not the given type of defect has occurred on the basis of the validity.

In the inspection support apparatus according to the above-described aspect, the information pertaining to the influence may include information guiding to inspect for the other type of defect that influences the inspection result of inspecting for the given type of defect. In this case, it is possible for the user to ascertain which type of defect should be inspected for, which improves the convenience.

In the inspection support apparatus according to the above-described aspect, the instruction unit may instruct the inspection apparatus to inspect for the other type of defect determined by the determination unit to influence the inspection result of inspecting for the given type of defect. Alternatively, the storage unit may store the inspection results obtained by the obtainment unit as history information; and the determination unit may obtain, from the history information in the storage unit, the inspection result of inspecting for the other type of defect determined to influence the inspection result of inspecting for the given type of defect. In this case, the inspection results for the other type of defects that influences the inspection result of inspecting for the given type of defect can be obtained, and thus the user can appropriately ascertain a plurality of types of defects that may have occurred.

In the inspection support apparatus according to the above-described aspect, the determination unit may find, for each of the plurality of types of defects, an influence level indicating a level of influence that type of defect will have on inspections for the other types of defects, on the basis of the defect correlation information in the storage unit; and set an order in which to inspect for defects on the basis of the influence levels found for the plurality of types of defects. Here, the instruction unit may instruct the inspection apparatus to inspect for the defects on the basis of the order set by the determination unit. In this case, the inspection for the defects can be carried out in order from, for example, the highest influence level, which makes it possible to inspect for the defects in the appropriate order.

An inspection system including one or more inspection apparatuses configured to inspect a DC power source, that generates power or charges and discharges power, for a plurality of types of defects on the basis of a result of measuring the DC power source, and the inspection support apparatus configured as described above, achieves the same effects as those described above.

Furthermore, the inspection system may include a measurement apparatus that takes a measurement for the DC power source. The measurement apparatus, the inspection apparatus, and the inspection support apparatus may be separate apparatuses, or at least two made be integrated into a single apparatus. Separate apparatuses may be communicably connected over at least one of a hard wire, a wireless connection, and a communication network. The measurement apparatus may remain attached to the DC power source, or may be attached only temporarily.

A control method for an inspection support apparatus according to another aspect is a control method for an inspection support apparatus that supports inspection of a DC power source, that generates power or charges and discharges power, for a plurality of types of defects. The method includes: instructing an inspection apparatus to inspect for at least one of the plurality of types of defects; obtaining a result of inspecting for the defect from the inspection apparatus; referring to, for each of the plurality of types of defects, defect correlation information pertaining to influence one type of defect will have on the inspection for another type of defect, from a storage unit storing the defect correlation information, and determining the influence another type of defect will have on an inspection result of inspecting for a given type of defect obtained in the step of obtaining; and outputting information pertaining to the influence determined in the step of determining via an output unit.

According to this method, the same effects as the above-described inspection support apparatus can be achieved.

The inspection support apparatus may be implemented by a computer. In this case, an inspection support apparatus control program that implements the inspection support apparatus in the computer by causing the computer to function as the various elements included in the inspection support apparatus, and a computer-readable recording medium in which that program is recorded, also fall within the scope of the present invention.

According to one aspect, the influence of another type of defect on the inspection result of inspecting a given type of defect is determined, and information pertaining to the determined influence is outputted. As such, a user can easily determine the likelihood that the given type of defect and the other type of defect have occurred. This achieves an effect that the user can easily ascertain a plurality of types of effects that may have occurred.

DETAILED DESCRIPTION

Embodiments will be described in detail hereinafter. To simplify the descriptions, elements having the same functions as the elements described in the embodiments will be given the same reference numerals, and descriptions thereof will be omitted as appropriate.

First Embodiment

Configuration of Photovoltaic Power Generation System

Figure 1:
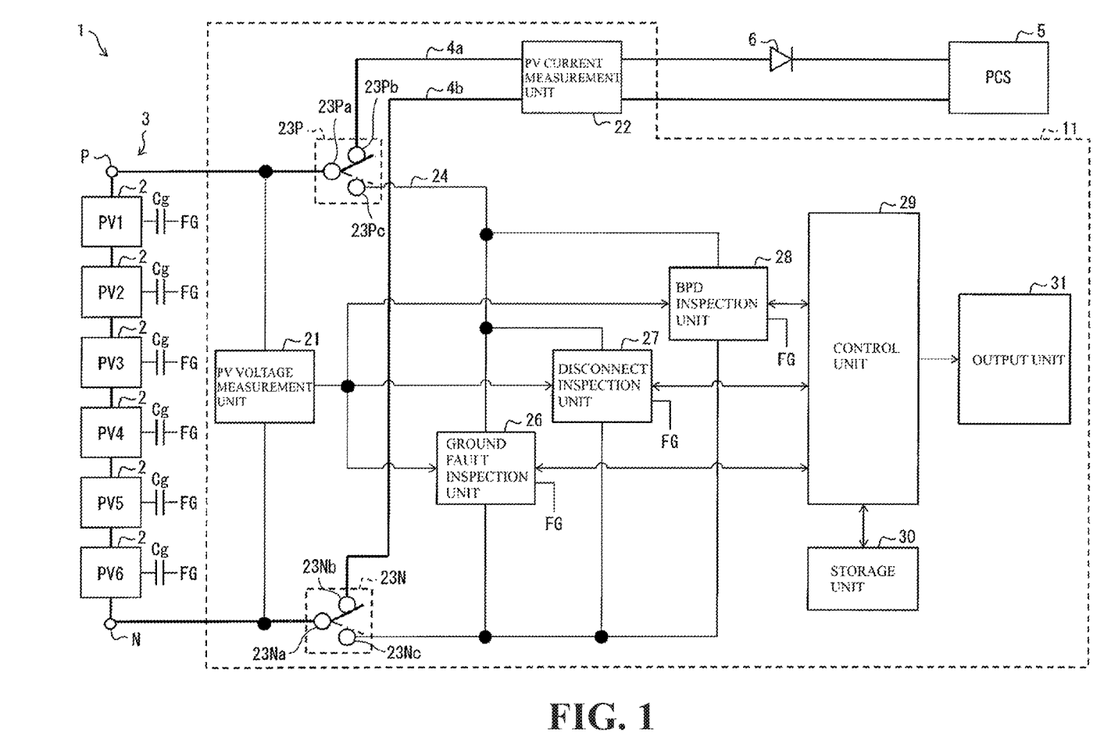
FIG. 1 is a block diagram illustrating the overall configuration of a photovoltaic power generation system including an inspection apparatus according to an embodiment.

FIG. 1 is a block diagram illustrating the overall configuration of a photovoltaic power generation system 1 including an inspection apparatus 11 according to an embodiment. In the drawings described hereinafter, "FG" refers to "frame ground".

As illustrated in FIG. 1, the photovoltaic power generation system 1 includes a solar cell string 3 (a DC power source) constituted of a plurality of solar cell modules 2 connected in series. Each solar cell module 2 includes a plurality of solar cells connected in series, and is formed as a panel. A bypass diode (BPD) for bypassing the current path of the solar cells is connected in parallel to each solar cell module 2.

Power generated by the solar cell string 3 is supplied to a power conditioning system (PCS) 5 over power conducting paths 4a and 4b, which are power lines. A diode 6 for preventing backfeeding is provided in the conducting path 4a, for example. Note that FIG. 1 illustrates a case where the solar cell string 3 includes six solar cell modules 2 connected in series as an example. In each solar cell module 2, a ground capacitance Cg is formed between the solar cells and wires in the solar cell module 2 and the frame ground (FG).

Configuration of Inspection Apparatus

The inspection apparatus 11 inspects the solar cell string 3 for defects every predetermined period, such as every day or every few days, or when a predetermined condition is met. To that end, the inspection apparatus 11 includes a PV voltage measurement unit 21, a PV current measurement unit 22, switching relays 23P and 23N, an inspection conducting path 24, a ground fault inspection unit 26 (inspection apparatus), a disconnect inspection unit 27 (inspection apparatus), a BPD inspection unit 28 (inspection apparatus), a control unit 29 (inspection support apparatus), a storage unit 30 (inspection support apparatus), and an output unit 31.

The PV voltage measurement unit 21 measures an inter-terminal voltage between a P terminal and an N terminal of the solar cell string 3, or in other words, an output voltage of the solar cell string 3. "Output voltage" includes a DC component and an AC component of the voltage of the solar cell string 3. "AC component" may be a value pertaining to a voltage amplitude, such as an effective value or a peak-to-peak value. The result of this measurement is inputted to the disconnect inspection unit 27 and the BPD inspection unit 28.

The PV current measurement unit 22 is provided in the power conducting paths 4a and 4b, and measures current flowing in the power conducting paths 4a and 4b, or in other words, output current of the solar cell string 3. The result of this measurement is inputted to the disconnect inspection unit 27 and the BPD inspection unit 28.

The switching relays 23P and 23N are provided in the power conducting paths 4a and 4b, and switch a supply path of the power outputted from the solar cell string 3 between the PCS 5 side and the inspection conducting path 24 side. Specifically, a traveling contact 23Pa of the switching relay 23P is connected to the P terminal of the solar cell string 3, a fixed contact 23Pb is connected to the PCS 5 via the PV current measurement circuit 22 and the diode 6, and a fixed contact 23Pc is connected to the inspection conducting path 24. Likewise, a traveling contact 23Na of the switching relay 23N is connected to the N terminal of the solar cell string 3, a fixed contact 23Nb is connected to the PCS 5 via the PV current measurement circuit 22, and a fixed contact 23Nc is connected to the inspection conducting path 24.

The ground fault inspection unit 26, the disconnect inspection unit 27, and the BPD inspection unit 28 are provided in parallel in the inspection conducting path 24. The ground fault inspection unit 26 inspects the solar cell string 3 for a ground fault. The disconnect inspection unit 27 inspects the solar cell string 3 for a disconnect defect. The BPD inspection unit 28 inspects the solar cell modules 2 of the solar cell string 3 for the above-described BPD disconnect defects. Inspection results from the ground fault inspection unit 26, the disconnect inspection unit 27, and the BPD inspection unit 28 are inputted to the control unit 29. The ground fault inspection unit 26, the disconnect inspection unit 27, and the BPD inspection unit 28 will be described in detail later.

The control unit 29 controls the overall operations of the various elements in the inspection apparatus 11, and is constituted of a central processing unit (CPU), memory, and so on, for example. The operations of the various elements are controlled by causing a computer to execute a control program. The storage unit 30 records information, and is constituted by a recording device such as a hard disk or flash memory. The control unit 29 and the storage unit 30 will be described in detail later.

The output unit 31 outputs various types of information on the basis of data from the control unit 29. Specifically, the output unit 31 displays various types of information, outputs audio, prints information, records information into a removable recording medium, sends information to an external device, or the like.

The ground fault inspection unit 26, the disconnect inspection unit 27, and the BPD inspection unit 28 include various types of circuits and processors for realizing their respective functions. However, the circuits and processors may be shared among at least two of the ground fault inspection unit 26, the disconnect inspection unit 27, and the BPD inspection unit 28. Furthermore, the processors may be shared among the control unit 29 and at least one of the ground fault inspection unit 26, the disconnect inspection unit 27, and the BPD inspection unit 28.

Overview of Control Unit and Storage Unit

Figure 2:
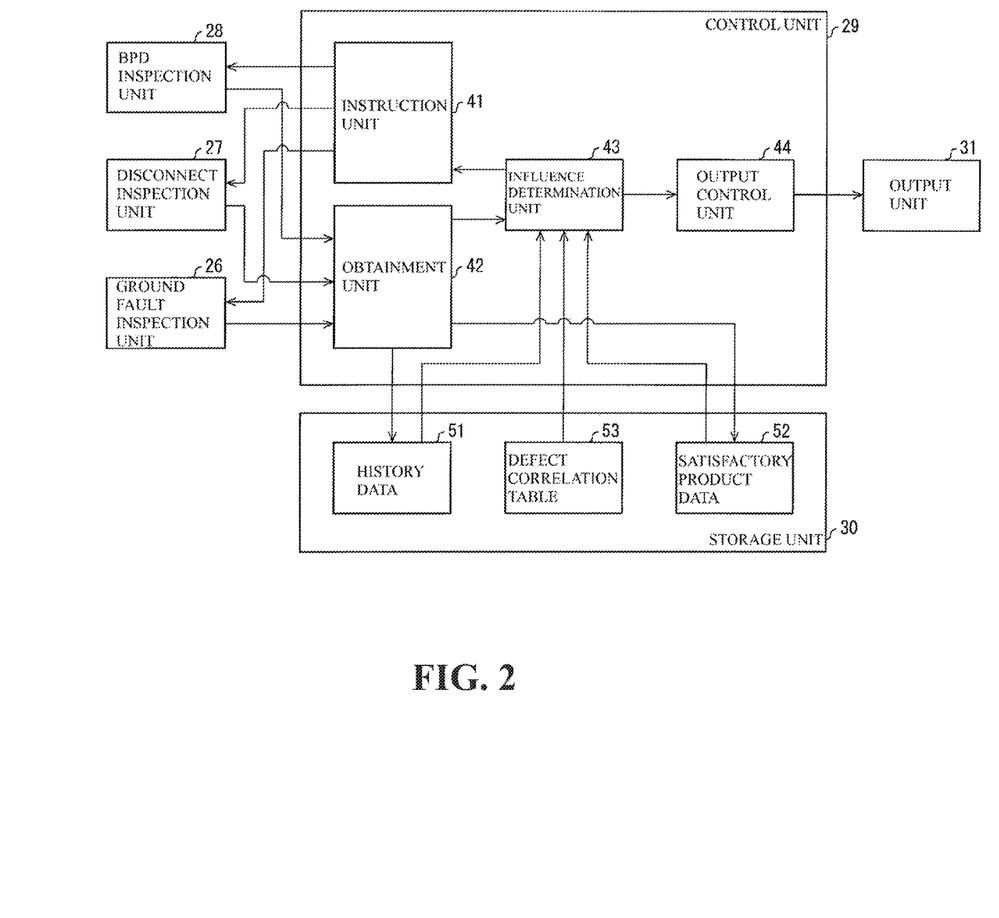
FIG. 2 is a block diagram illustrating the overall configuration of a control unit and a storage unit in an inspection apparatus.

FIG. 2 is a block diagram illustrating the overall configuration of the control unit 29 and the storage unit 30. As illustrated in FIG. 2, the control unit 29 includes an instruction unit 41, an obtainment unit 42, an influence determination unit 43 (determination unit), and an output control unit 44. The storage unit 30 stores history data 51 (history information), satisfactory product data 52, and a defect correlation table 53 (defect correlation information).

Details of Storage Unit

The history data 51 includes the inspection results from the ground fault inspection unit 26, the disconnect inspection unit 27, and the BPD inspection unit 28 along with the date/time of each inspection. The satisfactory product data 52 includes measurement data for a satisfactory product, corresponding to a solar cell string 3 for which neither the ground fault inspection unit 26, nor the disconnect inspection unit 27, nor the BPD inspection unit 28 has detected a defect.

Figure 3:
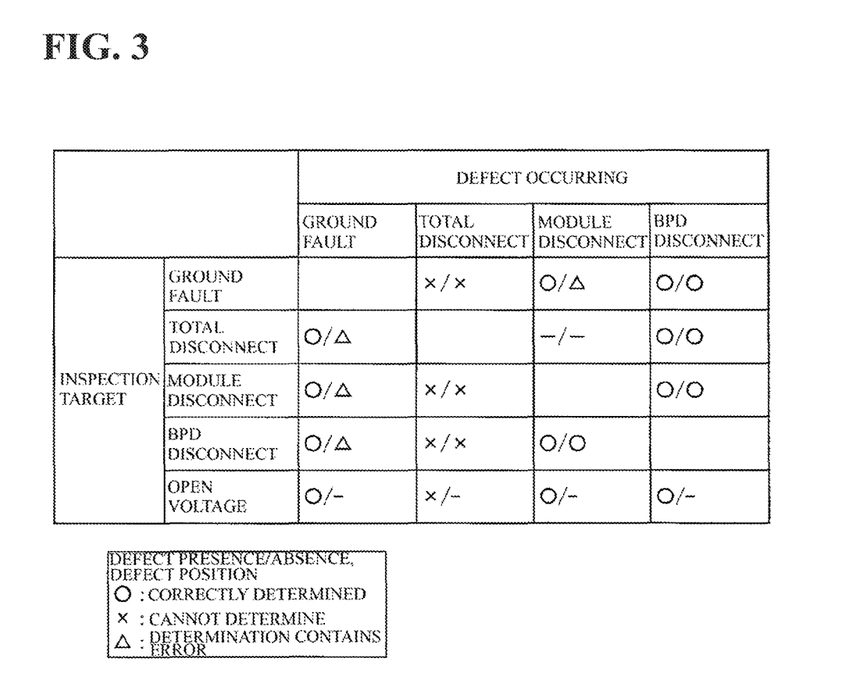
FIG. 3 is a diagram illustrating an example of a defect correlation table stored in a storage unit.

FIG. 3 is a diagram illustrating an example of the defect correlation table 53. The defect correlation table 53 indicates what influence a given type of defect will have on the inspection of the other types of defects. The inspections performed by the ground fault inspection unit 26, the disconnect inspection unit 27, and the BPD inspection unit 28 will be described in detail next, and the content of FIG. 3 will be described as well.

Details of Inspection Units
Ground Fault Inspection

The ground fault inspection unit 26 inspects the solar cell string 3 for a ground fault, and in the case where a ground fault defect has occurred, identifies the position where the ground fault defect has occurred. A conventional known technique can be used for the ground fault inspection unit 26, and in an embodiment, the technique disclosed in JP 2016-050783A (described above) is used.

That is, the ground fault inspection unit 26 opens the conducting path connected to the N terminal of the solar cell string 3, connects the conducting path connected to the P terminal to an FG via a detection resistance (not shown), and detects a first voltage V1 arising across both ends of the detection resistance at that time. Likewise, the ground fault inspection unit 26 opens the conducting path connected to the P terminal of the solar cell string 3, connects the conducting path connected to the N terminal to the FG via the detection resistance, and detects a second voltage V2 arising across both ends of the detection resistance at that time. Furthermore, the ground fault inspection unit 26 obtains an output voltage (inter terminal voltage) Vpv from the solar cell string 3, measured by the PV voltage measurement unit 21.

Next, the ground fault inspection unit 26 finds an insulation resistance value Rleake through the following formula (1), using the first voltage V1 and the second voltage V2 found as described above, the obtained output voltage Vpv, and a resistance value R1 of the detection resistance.

$$Rleake = R1 \times |Vpv| \div |V1 - V2| - R1 \quad (1)$$

If the insulation resistance value Rleake is less than or equal to a predetermined threshold, it can be determined that a ground fault has occurred. Additionally, the position of the ground fault can be found from the ratio between the absolute value of the first voltage V1 and the absolute value of the second voltage V2.

Disconnect Inspection

The disconnect inspection unit 27 inspects the solar cell modules 2 of the solar cell string 3 for disconnects, and when a disconnect defect has occurred, identifies the solar cell module 2 in which the disconnect defect has occurred. A conventional known technique can be used for the disconnect inspection unit 27, and in an embodiment, the technique disclosed in JP 2016-093039A (described above) is used.

That is, the disconnect inspection unit 27 opens the conducting path connected to the N terminal of the solar cell string 3, applies an AC inspection signal to the conducting path connected to the P terminal, and measures an impedance Zp. Likewise, the disconnect inspection unit 27 opens the conducting path connected to the P terminal of the solar cell string 3, applies the AC inspection signal to the conducting path connected to the N terminal, and measures an impedance Zn. The position of the defect can be found by calculating the ratio between Zn/(Zp+Zn) and Zp/(Zp+Zn). An impedance analyzer may be used to measure the impedance.

If the impedances Zp and Zn have the same value, it is conceivable that a disconnect defect has not occurred in the solar cell string 3, or that a disconnect defect has occurred in a central position of the solar cell string 3.

Accordingly, when the impedances Zp and Zn have the same value, the disconnect inspection unit 27 finds an overall impedance Zpn of the solar cell string 3 by applying the inspection signal between the P terminal and the N terminal of the solar cell string 3. The overall impedance Zpn is then compared to the impedance Zp or Zn, and if the impedances differ, the disconnect inspection unit 27 can determine that a disconnect defect has occurred in the central position of the solar cell string 3. If the values are the same, the disconnect inspection unit 27 can determine that a disconnect defect has not occurred in the solar cell string 3.

Incidentally, a disconnect occurring in the solar cell string 3 includes a disconnect within a solar cell module 2 and a disconnect outside of the solar cell modules 2.

If a defect caused by a disconnect within a solar cell module 2 has occurred, the BPD in that solar cell module 2 allows current arising in other solar cell modules 2 to flow. The solar cell string 3 can therefore supply power. As a result, the inter-terminal voltage (solar cell string 3 output voltage) Vpv, which is measured by the PV voltage measurement unit 21, arises between the P terminal and the N terminal of the solar cell string 3. A disconnect occurring within a solar cell module 2 will be called a "module disconnect" hereinafter.

On the other hand, a disconnect caused by a poor connection between adjacent solar cell modules 2, a disconnect caused by a poor connection between the P terminal or the N terminal and a solar cell module 2, and so on can be given as examples of disconnects occurring outside of the solar cell modules 2. When a defect occurs due to this kind of disconnect, the solar cell string 3 cannot supply power. As a result, the output voltage Vpv of the solar cell string 3, measured by the PV voltage measurement unit 21, is almost 0 V. A disconnect occurring outside of the solar cell modules 2 will be called a "total disconnect" hereinafter.

Accordingly, if it is determined that a disconnect defect has occurred, the disconnect inspection unit 27 obtains the output voltage Vpv of the solar cell string 3, measured by the PV voltage measurement unit 21. If the obtained output voltage Vpv is greater than a predetermined threshold that is a positive value close to 0, it can be determined that the disconnect defect is a defect caused by a module disconnect. On the other hand, if the obtained output voltage Vpv is less than or equal to the predetermined threshold, it can be determined that the disconnect defect is a defect caused by a total disconnect.

BPD Inspection

The BPD inspection unit 28 inspects the solar cell modules 2 of the solar cell string 3 for BPD disconnects, and when a disconnect defect has occurred in the BPD, identifies the solar cell module 2 in which the BPD disconnect defect has occurred. A conventional known technique can be used for the BPD inspection unit 28, and in an embodiment, the technique described hereinafter is used.

The inspection by the BPD inspection unit 28 is carried out while the solar cell string 3 is in a non-power-generating state (at night, for example). First, the BPD inspection unit 28 injects a first DC current I1 into the solar cell string 3, and a first DC voltage Vpn1 between the PN terminals of the solar cell string 3 is measured by the PV voltage measurement unit 21. Next, the BPD inspection unit 28 injects a second DC current I2 (where I2>I1) into the solar cell string 3, and a second DC voltage Vpn2 between the PN terminals of the solar cell string 3 is measured by the PV voltage measurement unit 21.

Next, the BPD inspection unit 28 finds a voltage Vpnd from the first DC voltage Vpn1 and the second DC voltage Vpn2 (Vpnd=|Vpn2|−|Vpn1|). If the voltage Vpnd is greater than a predetermined threshold, it is determined that a solar cell module 2 in which the BPD has a disconnect defect is present within the solar cell string 3. On the other hand, if the voltage Vpnd is less than or equal to the predetermined threshold, it is determined that a solar cell module 2 in which the BPD has a disconnect defect is not present within the solar cell string 3.

If it has been determined that a solar cell module 2 in which the BPD has a disconnect defect is present in the solar cell string 3, the BPD inspection unit 28 first applies a disconnect position identification signal, in which AC overlaps DC, between the PN terminals of the solar cell string 3. Next, an AC component Vfg-p of a voltage between the P terminal and the frame ground FG is measured. Likewise, an AC component Vn-fg of a voltage between the N terminal and the frame ground FG is measured.

Next, using a number N of the solar cell modules 2 in the solar cell string 3, the voltage AC component Vfg-p, and the voltage AC component Vn-fg, the BPD inspection unit 28 can identify the position, from the P terminal (positive terminal), of the solar cell module 2 in which the BPD has a disconnect defect as follows.

$$N \times Vn\text{-}fg/(Vfg\text{-}p+Vn\text{-}fg)$$

Defect Correlation Table

The influence a given type of defect has on the inspection of other types of defects will be described next with reference to the defect correlation table illustrated in FIG. 3. Note that in FIG. 3, the defects to be inspected for are arranged in the rows, and the defects currently arising are arranged in the columns. A symbol indicating the determination as to whether or not a defect has occurred is provided on the left side of each field, and a symbol indicating the determination (identification) of the position of the defect is provided on the right side. A circle indicates that a correct determination can be made, an x indicates that a determination cannot be made, and a triangle indicates that the determination contains error. A dash indicates that no inspection is to be made.

Ground Fault Inspection

When a total disconnect defect has occurred, the solar cell string 3 does not generate power, and thus the output voltage Vpv is zero. Furthermore, no current flows in the detection resistance of the ground fault inspection unit 26, and thus the first voltage V1 and the second voltage V2 are both zero. As such, the ground fault inspection unit 26 cannot determine whether or not a ground fault has occurred, and cannot identify the position of the ground fault. The corresponding field in FIG. 3 thus contains "x/x".

When a module disconnect defect has occurred, the solar cell string 3 generates power, and thus the output voltage Vpv can be measured. Furthermore, current flows in the detection resistance of the ground fault inspection unit 26, and thus the first voltage V1 and the second voltage V2 can be measured. The ground fault inspection unit 26 can therefore correctly determine whether or not a ground fault has occurred. However, one of the first voltage V1 and the second voltage V2 varies due to the module disconnect. As such, the position of the ground fault found (determined) by the ground fault inspection unit 26 from the ratio between the absolute value of the first voltage V1 and the absolute value of the second voltage V2 will deviate from the actual position. The corresponding field in FIG. 3 thus contains "○/△". Note that the ground fault inspection unit 26 can correct the position of the ground fault that has been found to the actual position, determine a certainty as to the extent to which the position deviates from the actual position, and so on by identifying the position of the module disconnect and calculating an amount of variation in the voltage.

Even if a BPD disconnect defect has occurred, that disconnect has no effect on the measurement of the output voltage Vpv, the first voltage V1, and the second voltage V2. As such, the ground fault inspection unit 26 can correctly determine whether or not a ground fault has occurred, and can correctly find (determine) the position of the ground fault. The corresponding field in FIG. 3 thus contains "○/○".

Total Disconnect Inspection

Even if a ground fault has occurred, the output voltage Vpv and the impedances Zp, Zn, and Zpn can be measured, and thus the disconnect inspection unit 27 can correctly determine whether or not a total disconnect has occurred. However, the impedances Zp and Zn vary depending on ground fault resistance, and thus the position of the total disconnect found from the ratio between Zn/(Zp+Zn) and Zp/(Zp+Zn) will deviate from the actual position. The corresponding field in FIG. 3 thus contains "○/△". Note that in an embodiment, the ground fault resistance cannot be measured if a total disconnect defect has occurred, as described above. It is thus difficult for the disconnect inspection unit 27 to correct the position of the total disconnect that has been found to the actual position.

If the disconnect inspection unit 27 has determined that a module disconnect defect has occurred, the output voltage Vpv is being generated, which means that a total disconnect defect has not occurred. It is thus not necessary to inspect for a total disconnect, and the corresponding field in FIG. 3 contains "-/-".

Even if a BPD disconnect defect has occurred, that disconnect has no effect on the measurement of the output voltage Vpv and the impedances Zp, Zn, and Zpn. As such, the disconnect inspection unit 27 can correctly determine whether or not a total disconnect has occurred, and can correctly find the position of the total disconnect. The corresponding field in FIG. 3 thus contains "○/○".

Module Disconnect Inspection

Even if a ground fault has occurred, the output voltage Vpv and the impedances Zp, Zn, and Zpn can be measured, and thus the disconnect inspection unit 27 can correctly determine whether or not a module disconnect has occurred. However, the impedances Zp and Zn vary depending on ground fault resistance, and thus the position of the module disconnect found from the ratio between Zn/(Zp+Zn) and Zp/(Zp+Zn) will deviate from the actual position. The corresponding field in FIG. 3 thus contains "○/△". Note that the disconnect inspection unit 27 can correct the position of the module disconnect that has been found to the actual position, determine a certainty as to the extent to which the position deviates from the actual position, and so on by measuring the ground fault resistance value and calculating an amount of variation in the impedances Zp and Zn caused by the ground fault resistance.

If the disconnect inspection unit 27 has determined that a total disconnect defect has occurred, it is unclear as to whether or not a module disconnect defect has also occurred. Thus the disconnect inspection unit 27 cannot determine whether or not a module disconnect has occurred, and cannot identify the position of the module disconnect. The corresponding field in FIG. 3 thus contains "x/x".

Even if a BPD disconnect defect has occurred, that disconnect has no effect on the measurement of the output voltage Vpv and the impedances Zp, Zn, and Zpn. As such, the disconnect inspection unit 27 can correctly determine whether or not a module disconnect has occurred, and can correctly find the position of the module disconnect. The corresponding field in FIG. 3 thus contains "○/○".

BPD Disconnect Inspection

Even if a ground fault has occurred, the DC voltages Vpn1 and Vpn2 can be measured, and thus the BPD inspection unit 28 can correctly determine whether or not a BPD disconnect has occurred. However, the voltage AC components Vfg–p and Vn–fg vary due to the ground fault resistance, and thus the position of the BPD disconnect found from those measurement values will deviate from the actual position. The corresponding field in FIG. 3 thus contains "○/Δ". Note that the BPD inspection unit 28 can correct the position of the BPD disconnect that has been found to the actual position, determine a certainty as to the extent to which the position deviates from the actual position, and so on by measuring the ground fault resistance value and calculating an amount of variation in the voltage AC components Vfg–p and Vn–fg caused by the ground fault resistance.

If a total disconnect defect has occurred, a DC current cannot be injected into the solar cell string 3, and thus the DC voltages Vpn1 and Vpn2 cannot be measured. As such, the BPD inspection unit 28 cannot determine whether or not a BPD disconnect has occurred, and cannot identify the position of the BPD disconnect. The corresponding field in FIG. 3 thus contains "x/x".

Even if a module disconnect defect has occurred, that disconnect has no effect on the measurement of the DC voltages Vpn1 and Vpn2 and the voltage AC components Vfg–p and Vn–fg. As such, the BPD inspection unit 28 can correctly determine whether or not a BPD disconnect has occurred, and can correctly find the position of the BPD disconnect. The corresponding field in FIG. 3 thus contains "○/○".

Open Voltage

An open voltage, or in other words, an inter-terminal voltage between the P terminal and the N terminal of the solar cell string 3, can be measured as long as a total disconnect defect has not occurred. As such, whether or not an open voltage abnormality (defect) has occurred can be determined as long as a total disconnect defect has not occurred. Note that position has no relation to open voltage abnormalities.

Details of Control Unit

The instruction unit 41 instructs the ground fault inspection unit 26, the disconnect inspection unit 27, and the BPD inspection unit 28 to carry out inspections. The inspection instructions may be made every predetermined period, may be made on the basis of an instruction from the influence determination unit 43, or may be made on the basis of an instruction from a user.

The obtainment unit 42 obtains inspection result data from the ground fault inspection unit 26, the disconnect inspection unit 27, and the BPD inspection unit 28. The inspection results include whether or not there is a defect, the position of the defect, measurement values, and so on. The obtainment unit 42 adds the obtained inspection results, along with the inspection date/time, to the history data 51 in the storage unit 30, and sends the obtained inspection results to the influence determination unit 43. Additionally, if the obtainment unit 42 has obtained inspection results indicating no defects from the ground fault inspection unit 26, the disconnect inspection unit 27, and the BPD inspection unit 28, the solar cell string 3 is considered to be a satisfactory product and the measurement values in the inspection results are added to the satisfactory product data 52 in the storage unit 30.

The influence determination unit 43 refers to the defect correlation table 53 in the storage unit 30, and determines whether another type of defect will have any influence on the inspection result for a given kind of defect from the obtainment unit 42. The influence determination unit 43 creates information pertaining to the influence has determined and sends that information to the output control unit 44.

The following can be given as an example of the influence as determined by the influence determination unit 43. Referring to the defect correlation table 53 in FIG. 3, if the inspection result indicates a ground fault has been detected, a total disconnect has not occurred, but it is possible that a module disconnect has occurred. In this case, it can be determined that the position of the ground fault may contain error and a BPD disconnect may have occurred. Meanwhile, if the inspection result indicates that a total disconnect has been detected, a ground fault may have occurred. In this case, it can be determined that the position of the total disconnect may contain error, whether or not a cluster disconnect has occurred is unclear, and that a BPD disconnect may have occurred.

The output control unit 44 creates output data on the basis of the information from the influence determination unit 43, and sends that data to the output unit 31. Accordingly, information pertaining to the influence as determined by the influence determination unit 43 can be outputted through the output unit 31.

By referring to the outputted information, a user can easily determine whether a defect of a different type from the detected defect type has occurred. This makes it possible for the user to easily ascertain a plurality of types of defects that may have occurred.

The influence determination unit 43 furthermore notifies the instruction unit 41 of the types of defect determined to influence the inspection results. The instruction unit 41 can therefore instruct the ground fault inspection unit 26, the disconnect inspection unit 27, or the BPD inspection unit 28 to inspect for defects corresponding to the notified type. For example, if the inspection results indicate that a ground fault has been detected, the instruction unit 41 instructs the disconnect inspection unit 27 to inspect for a cluster disconnect, which influences the position of the ground fault. If the inspection results indicate that a total disconnect has been detected, the instruction unit 41 instructs the ground fault inspection unit 26 to inspect for a ground fault, which influences the position of the total disconnect. In this case, the inspection results for other types of defects that influence the stated inspection results can be obtained, and thus the user can appropriately ascertain a plurality of types of defects that may have occurred. Rather than notifying the instruction unit 41 of the types of defects determined to influence the stated inspection results, the influence determination unit 43 may instead obtain the inspection results for those types of defects from the history data 51 in the storage unit 30.

Processing of Control Unit

Figure 4:
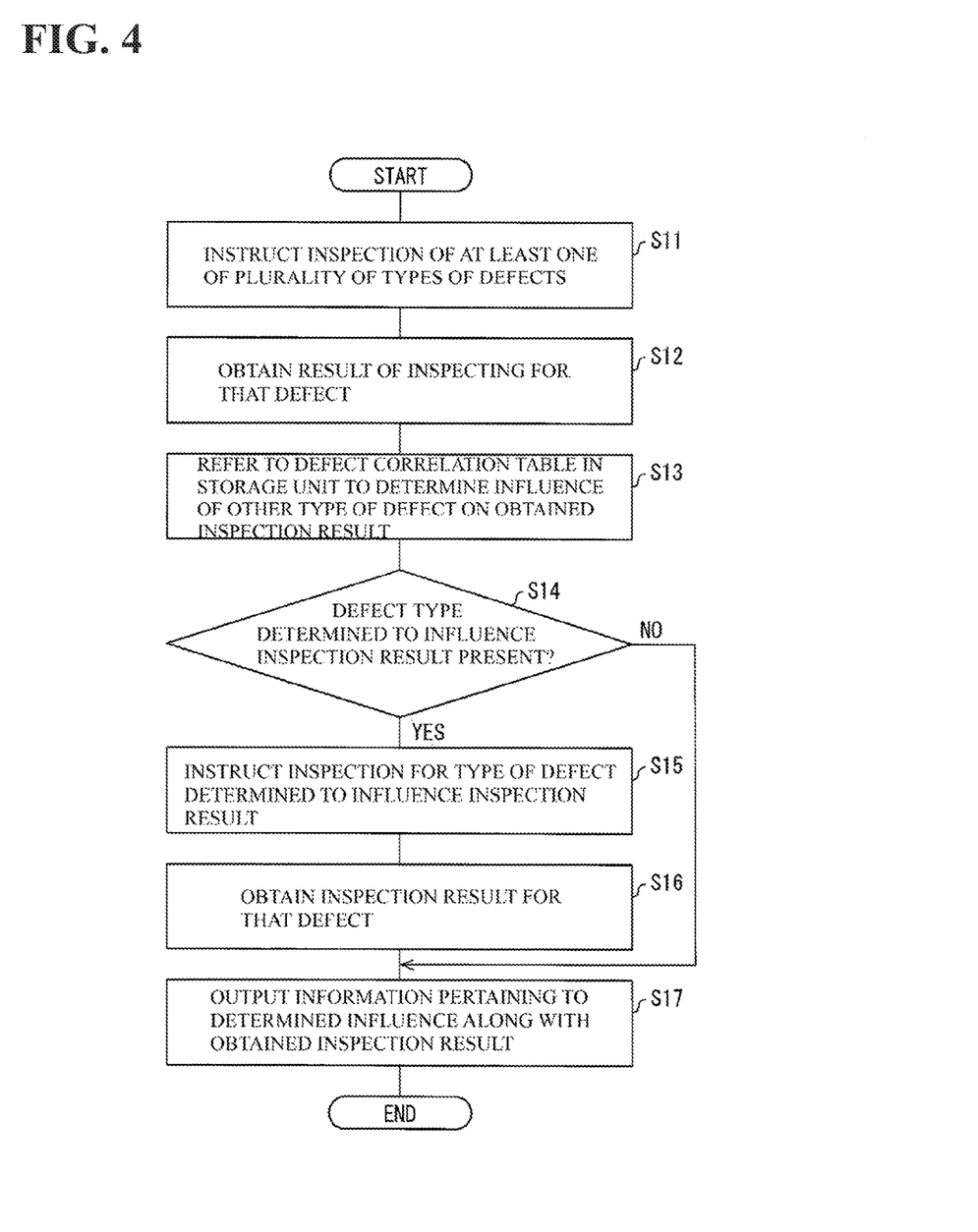
FIG. 4 is a flowchart illustrating the flow of processing carried out by a control unit.

FIG. 4 is a flowchart illustrating the flow of processing carried out by the control unit 29 of the inspection apparatus 11 configured as described above. As illustrated in FIG. 4, first, the instruction unit 41 instructs the ground fault inspection unit 26, the disconnect inspection unit 27, or the BPD inspection unit 28 to inspect for at least one of the plurality of types of defects (S11). As a result, the obtainment unit 42 obtains an inspection result for that defect from the ground fault inspection unit 26, the disconnect inspection unit 27, or the BPD inspection unit 28 (S12).

Next, the influence determination unit 43 refers to the defect correlation table 53 in the storage unit 30, and determines whether another type of defect will have any influence on the inspection result obtained by the obtainment unit 42 (S13). At this time, it is determined whether or not a defect type determined to influence the inspection result is present (S14). If such a type is present, the process advances to step S15, whereas if such a type is not present, the process advances to step S17.

In step S15, the ground fault inspection unit 26, the disconnect inspection unit 27, or the BPD inspection unit 28 is instructed to inspect for a defect of a type determined to influence the stated inspection result. As a result, the obtainment unit 42 obtains an inspection result for that defect from the ground fault inspection unit 26, the disconnect inspection unit 27, or the BPD inspection unit 28, and sends the inspection result to the influence determination unit 43 (S16).

In step S17, the influence determination unit 43 outputs information pertaining to the influence as determined, along with the inspection result obtained from the obtainment unit 42, via the output control unit 44 and the output unit 31. After this, the process ends.

Supplementary Items

Note that the influence determination unit 43 may determine the validity of the inspection result on the basis of the influence as determined, and the determined validity may be included in the information pertaining to the influence. The validity may be expressed as a percentage, or like FIG. 3, may be expressed as three levels, where a circle indicates "valid", an x indicates "invalid", and a triangle indicates "partly valid". For example, if the inspection results indicate that a ground fault has been detected, the validity of a ground fault detection is "○" and the validity of the position of the ground fault is "Δ". Meanwhile, if the inspection results indicate that a total disconnect has been detected, the validity of a total disconnect detection is "○" and the validity of the position of the total disconnect is "Δ". Outputting information including the validity makes it possible to the user to easily determine whether or not the type of defect inspected for has occurred and the position of the defect on the basis of the validity.

Additionally, the influence determination unit 43 may include information guiding the user to inspect for other types of defects that influence the inspection result in the information pertaining to the influence. For example, if the inspection results indicate that a ground fault has been detected, information guiding the user to inspect for a cluster disconnect, which influences the position of the ground fault, can be given as an example of this guiding information. Additionally, if the inspection results indicate that a total disconnect has been detected, information guiding the user to inspect for a ground fault, which influences the position of the total disconnect, can be given as an example of this guiding information. Outputting this guiding information makes it possible for the user to ascertain which type of defect should be inspected for, which improves the convenience.

Additionally, the influence determination unit 43 may refer to the defect correlation table 53 in the storage unit 30, find, for each type of defect, an influence level indicating the level of influence that type of defect has on the inspections for other types of defects, and on the basis of the influence level found for each type of defect, set an order in which to inspect for defects. In this case, the instruction unit 41 may instruct the ground fault inspection unit 26, the disconnect inspection unit 27, and the BPD inspection unit 28 to inspect for defects on the basis of the order set by the influence determination unit 43.

Assigning two points to a circle, one point to a triangle, and zero points to an x and a - in the defect correlation table 53 illustrated in FIG. 3 can be given as an example of this influence level. In this case, the influence level of a ground fault is 11, the influence level of a total disconnect is 0, the influence level of a module disconnect is 9, and the influence level of a BPD disconnect is 14. The influence determination unit 43 may then set the order in which to inspect for defects to start from the lowest influence level. In this example, the inspections are carried out for a total disconnect, a module disconnect, a ground fault, and a BPD disconnect in that order. This makes it possible to inspect for defects in an appropriate order.

If the inspection apparatus 11 is connected to and inspects a different solar cell string 3, the influence determination unit 43 may compare the inspection results from the ground fault inspection unit 26, the disconnect inspection unit 27, and the BPD inspection unit 28 with the inspection results of satisfactory product data in the storage unit 30 and determine whether or not a defect has occurred.

Although the ground fault inspection unit 26, the disconnect inspection unit 27, and the BPD inspection unit 28 are provided in the embodiments described above, inspection units that inspect for other types of defects may be additionally provided as well.

Second Embodiment

Figure 5:
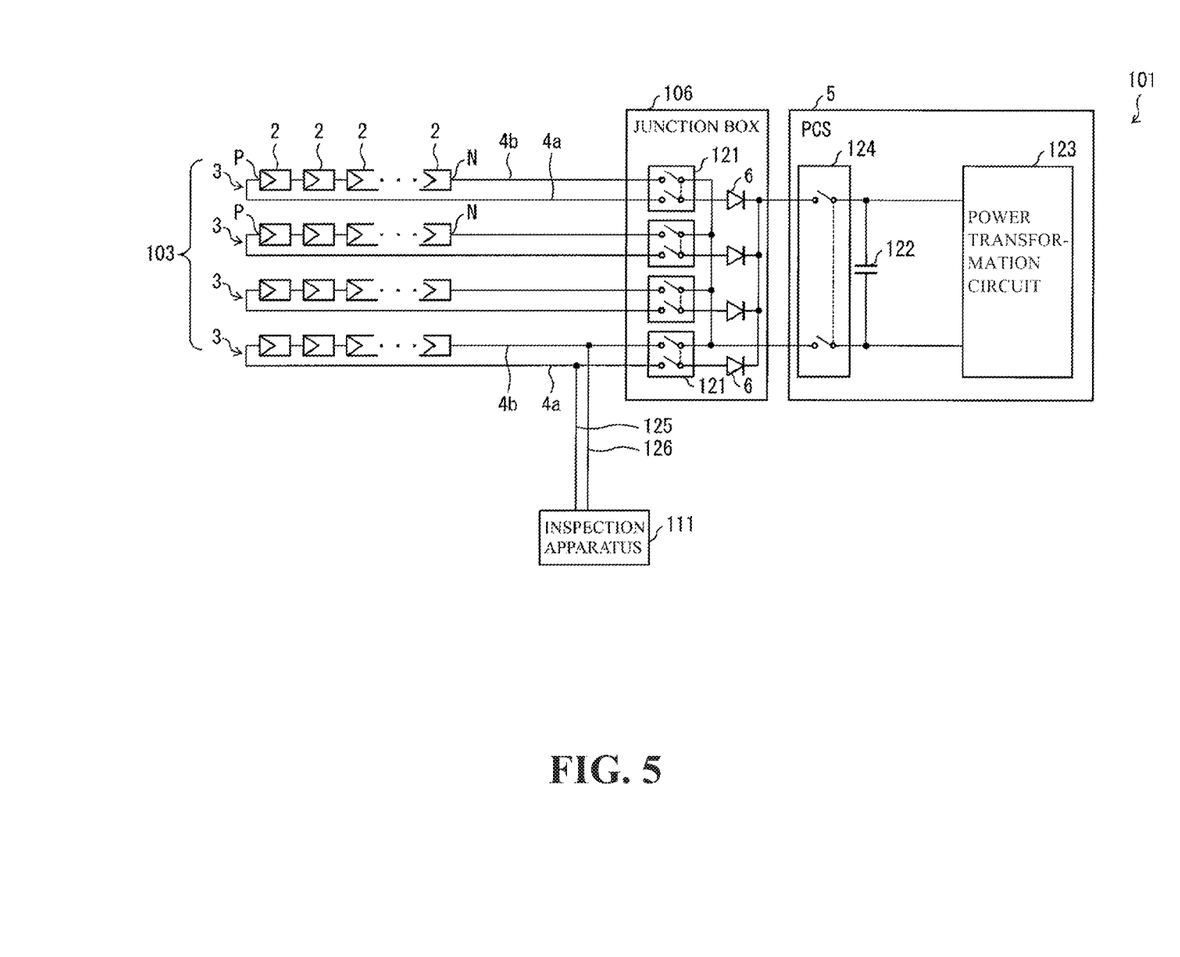
FIG. 5 is a schematic circuit diagram illustrating the configuration of a photovoltaic power generation system including an inspection apparatus according to another embodiment.

FIG. 5 is a schematic circuit diagram illustrating the configuration of a photovoltaic power generation system including an inspection apparatus according to another embodiment. A photovoltaic power generation system 101 according to an embodiment differs from the photovoltaic power generation system 1 illustrated in FIGS. 1 to 4 in that a solar cell array 103 including a plurality of solar cell strings 3 is provided instead of a single solar cell string 3, a junction box 106 including a plurality of diodes 6 for preventing backfeeding is provided instead of a single diode 6 for preventing backfeeding, and that an inspection apparatus 111 is provided instead of the inspection apparatus 11. The other configurations are the same.

The inspection apparatus 11 illustrated in FIGS. 1 to 4 is a type that remains attached to the photovoltaic power generation system 1. However, the inspection apparatus 111 according to an embodiment is a type that is temporarily attached to the photovoltaic power generation system 101. A tester, a logger, and so on can be given as examples of such an inspection apparatus 111, and it is desirable that the inspection apparatus 111 be portable.

The plurality of solar cell strings 3 constituting the solar cell array 103 are connected to the PCS 5 via the junction box 106. The junction box 106 is connected in parallel to the solar cell strings 3. Specifically, the power conducting paths 4a connected to the P terminals of the corresponding solar cell strings 3 are connected to each other, and the power conducting paths 4b connected to the N terminals of the corresponding solar cell strings 3 are connected to each other. Switching circuits 121 for electrically cutting off a corresponding solar cell string 3 from the photovoltaic power generation system 1 are provided in the junction box 106, and the diodes 6 for preventing backcurrent are provided downstream from the switching circuits 121.

A high-capacity capacitor 122 for stabilizing the power from the solar cell array 103, and a power transform circuit 123 for transforming that power into predetermined DC power or AC power, are provided in the PCS 5. Furthermore, a switching circuit 124 for electrically cutting off the PCS 5 from the solar cell array 103 and the junction box 106 is provided in the PCS 5.

The inspection apparatus 111 according to an embodiment differs from the inspection apparatus 11 illustrated in FIGS.

1 to 4 in that the switching relays 23P and 23N are not provided, and that two probes 125 and 126 for electrically connecting to the P terminal and the N terminal of a solar cell strings 3 are provided. The other configurations are the same. Tips of the two probes 125 and 126 are attached to the power conducting paths 4a and 4b, respectively, that are connected to the solar cell string 3 to be inspected. The inspection apparatus 111 can therefore inspect the solar cell string 3 to be inspected. Repeating this for the other solar cell strings 3 included in the photovoltaic power generation system 101 makes it possible to inspect all of the solar cell strings 3 included in the photovoltaic power generation system 101.

Third Embodiment

Figure 6:
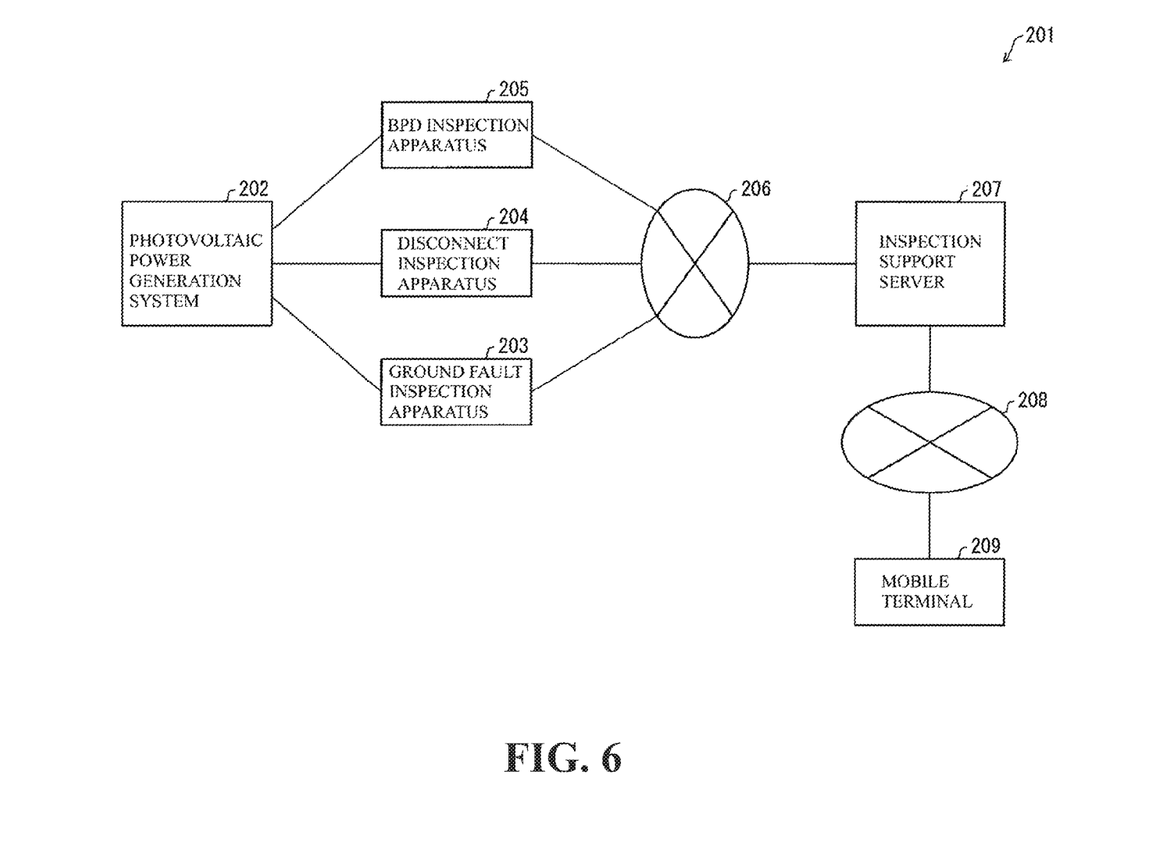
FIG. 6 is a block diagram illustrating the overall configuration of an inspection system according to another embodiment.

FIG. 6 is a block diagram illustrating the overall configuration of an inspection system according to another embodiment. As illustrated in FIG. 6, an inspection system 201 includes a photovoltaic power generation system 202, a ground fault inspection apparatus 203 (inspection apparatus), a disconnect inspection apparatus 204 (inspection apparatus), a BPD inspection apparatus 205 (inspection apparatus), a communication network 206, an inspection support server 207 (inspection support apparatus), a communication network 208, and a mobile terminal 209 (inspection support apparatus).

The photovoltaic power generation system 202 corresponds to the photovoltaic power generation system 101 illustrated in FIG. 5, with the inspection apparatus 111 omitted. In other words, the photovoltaic power generation system 202 includes the solar cell array 103, the junction box 106, and the PCS 5 illustrated in FIG. 5.

In an embodiment, the various inspections carried out by the inspection apparatus 111 illustrated in FIG. 5 are carried out by the individual apparatuses 203 to 205. In other words, the ground fault inspection apparatus 203 attaches the tips of two probes to the power conducting paths 4a and 4b connected to the solar cell string 3 to be inspected, and carries out the inspection in the same manner as the ground fault inspection unit 26 illustrated in FIG. 1. Likewise, the disconnect inspection apparatus 204 attaches the tips of two probes to the power conducting paths 4a and 4b connected to the solar cell string 3 to be inspected, and carries out the inspection in the same manner as the disconnect inspection unit 27 illustrated in FIG. 1. Furthermore, the BPD inspection apparatus 205 attaches the tips of two probes to the power conducting paths 4a and 4b connected to the solar cell string 3 to be inspected, and carries out the inspection in the same manner as the BPD inspection unit 28 illustrated in FIG. 1.

The ground fault inspection apparatus 203, the disconnect inspection apparatus 204, and the BPD inspection apparatus 205 send inspection results to the inspection support server 207 over the communication network 206. Additionally, the ground fault inspection apparatus 203, the disconnect inspection apparatus 204, and the BPD inspection apparatus 205 carry out inspections on the basis of instructions received from the inspection support server 207 over the communication network 206.

A known communication network such as the internet or a local area network (LAN) can be used as the communication network 206. A known communication line such as a public communication line, a private line, an Integrated Services Digital Network (ISDN), or power line communication, can be used as the communication line used by the communication network 206.

The inspection support server 207 has the same function as the control unit 29 and the storage unit 30 illustrated in FIG. 1. In other words, the inspection support server 207 stores the history data 51, the satisfactory product data 52, and the defect correlation table 53 stored in the storage unit 30 in FIG. 2, and functions as the instruction unit 41, the obtainment unit 42, the influence determination unit 43, and the output control unit 44 illustrated in FIG. 2. Output data created by the output control unit 44 is sent to the mobile terminal 209 over the communication network 208. The configuration of the inspection support server 207 is the same as the configuration of a normal personal computer (PC), and will thus not be described here.

The mobile terminal 209 is a mobile communication terminal that uses a wireless signal, such as a cellular phone, a smartphone, a Personal Handyphone System (PHS; trade name) terminal, a Personal Digital Assistant (PDA), or a mobile PC. In an embodiment, the mobile terminal 209 functions as the output unit 31 illustrated in FIGS. 1 and 2.

The inspection system 201 according to an embodiment has the same functions as those of the photovoltaic power generation systems 1 and 101 illustrated in FIGS. 1 to 5, and can therefore achieve the same effects. Furthermore, because the influence determination unit 43 of the control unit 29 and the defect correlation table 53 of the storage unit 30 illustrated in FIG. 2 are provided in the inspection support server 207, the processing capabilities of the influence determination unit 43 can be improved. A greater amount of data can thus be held in the defect correlation table 53, which makes it possible to even more appropriately determine a plurality of types of defects.

Variations

The ground fault inspection apparatus 203 may be changed to a ground fault measurement apparatus that takes measurements for inspecting the photovoltaic power generation system 202 for ground faults, and the inspection support server 207 may inspect for ground faults on the basis of measurement results from the ground fault measurement apparatus. Likewise, the disconnect inspection apparatus 204 may be changed to a disconnect measurement apparatus that takes measurements for inspecting the photovoltaic power generation system 202 for disconnects, and the inspection support server 207 may inspect for disconnects on the basis of measurement results from the disconnect measurement apparatus. Furthermore, the BPD inspection apparatus 205 may be changed to a BPD measurement apparatus that takes measurements for inspecting the BPDs of the photovoltaic power generation system 202, and the inspection support server 207 may inspect the BPDs on the basis of measurement results from the BPD measurement apparatus.

Supplementary Items

In the embodiments described above, an aspect is applied in a photovoltaic power generation system. However, the present invention is not limited thereto, and can be applied in any power system including a DC power source. In addition to photovoltaic power generation apparatus, fuel cell apparatuses capable of obtaining electrical energy (DC power) using hydrogen fuel through an electrochemical reaction between the hydrogen fuel and oxygen in the air, secondary batteries that accumulate electrical energy, capacitors, and so on can be given as examples of DC power sources.

Example of Implementation Using Software

The control blocks of the inspection apparatus 11 (and the control unit 29 in particular) may be implemented as logic circuits (hardware) formed in an integrated circuit (IC chip), or may be implemented as software using a central processing unit (CPU).

In the latter case, the inspection apparatus 11 includes a CPU that executes commands in programs, which are software for implementing the functions, read-only memory (ROM) or a storage device (called a "recording medium") in which the programs and various types of data are recorded so as to be readable by a computer (or the CPU), random access memory (RAM) into which the stated program is loaded, and so on. An aspect is achieved by the computer (or CPU) reading out the programs from the recording medium and executing the programs. A "non-transitory medium", such as tape, a disk, a card, semiconductor memory, a programmable logic circuit, or the like can be used as the recording medium. Additionally, the programs may be supplied to the computer through any transmission medium capable of transmitting the programs (a communication network, broadcast waves, or the like). An aspect can be realized as data signals embedded in carrier waves so as to realize the electronic transmission of the programs.

The present invention is not intended to be limited to the embodiments described above, and various changes can be made within the scope defined by the claims. Embodiments achieved by appropriately combining the technical means disclosed in different embodiments also fall within the technical scope of the present invention.

The invention claimed is:

1. An inspection support apparatus that supports inspection of a DC power source for a plurality of types of defects, the apparatus comprising a processor configured with a program to perform operations comprising:
    operation as a storage unit configured to store, for each of the plurality of types of defects, defect correlation information pertaining to an influence of each of the plurality of types of defects on inspection for an other of the plurality of types of defects;
    operation as an instruction unit configured to instruct an inspection apparatus to perform an inspection of the DC power source for at least one of the plurality of types of defects;
    operation as an obtainment unit configured to obtain, from the inspection apparatus, an inspection result of the inspection of the DC power source for the at least one of the plurality of types of defects;
    operation as a determination unit configured to determine, based on the inspection result and the stored defect correlation information for the at least one of the plurality of types of defects, the influence of at least one other of the plurality of types of defects on the inspection result; and
    operation as an output unit configured to output information to guide the inspection apparatus, the output information indicating whether the inspection result is influenced by the at least one other of the plurality of types of defects.

2. The inspection support apparatus according to claim 1, wherein the defect correlation information comprises a validity of the inspection result based on the influence of the at least one other of the plurality of types of defects.

3. The inspection support apparatus according to claim 2, wherein the information output by the output unit comprises information guiding the inspection apparatus to inspect for the at least one other of the plurality of types of defects that influences the inspection result of inspecting for the at least one type of defect.

4. The inspection support apparatus according to claim 3, wherein the processor is configured with the program such that operation as the instruction unit comprises operation as the instruction unit that instructs the inspection apparatus to perform an inspection of the DC power source for another type of the plurality of types of defects, determined by the determination unit to influence the inspection result.

5. The inspection support apparatus according to claim 2, wherein the processor is configured with the program such that operation as the instruction unit comprises operation as the instruction unit that instructs the inspection apparatus to perform an inspection of the DC power source for another type of the plurality of types of defects, determined by the determination unit to influence the inspection result.

6. The inspection support apparatus according to claim 1, wherein the information output by the output unit comprises information guiding the inspection apparatus to inspect for the at least one other of the plurality of types of defects that influences the inspection result of inspecting for the at least one type of defect.

7. The inspection support apparatus according to claim 6, wherein the processor is configured with the program such that operation as the instruction unit comprises operation as the instruction unit that instructs the inspection apparatus to inspect for the at least one other of the plurality of types of defects determined by the determination unit to influence the inspection result of inspecting for the at least one type of defect.

8. The inspection support apparatus according to claim 1, wherein the processor is configured with the program such that operation as the instruction unit comprises operation as the instruction unit that instructs the inspection apparatus to inspect for the at least one other of the plurality of types of defects determined by the determination unit to influence the inspection result of inspecting for the at least one type of defect.

9. The inspection support apparatus according to claim 1, wherein the processor is configured with the program such that:
    operation as the storage unit comprises operation as the storage unit that stores the inspection result obtained by the obtainment unit as history information; and
    operation as the determination unit comprises operation as the determination unit that obtains, from the history information in the storage unit, an inspection result of inspecting for the at least one other type of defect determined to influence the inspection result of the inspection of the DC power source for the at least one of the plurality of types of defects.

10. The inspection support apparatus according to claim 1, wherein the processor is configured with the program such that operation as the determination unit comprises operation as the determination unit that:
    finds, for each of the plurality of types of defects, an influence level indicating a level of influence of the type of defect on inspections for the other types of the plurality of types of defects, based on the defect correlation information in the storage unit;
    sets an order in which to inspect for defects based on the influence levels found for the plurality of types of defects; and
    the processor is configured with the program such that operation as the instruction unit comprises operation as the instruction unit that instructs the inspection apparatus to inspect for the defects based on the order set by the determination unit.

11. An inspection system comprising:
one or more inspection apparatuses configured to inspect a DC power source for a plurality of types of defects based on a result of measuring the DC power source; and
the inspection support apparatus according to claim 1.

12. A non-transitory computer-readable storage medium storing a control program for causing a computer to function as the inspection support apparatus according to claim 1, the control program causing the computer to function as the respective units.

13. A control method for an inspection support apparatus that supports inspection of a DC power source for a plurality of types of defects, the method comprising:
storing, for each of the plurality of types of defects, defect correlation information pertaining to an influence of each of the plurality of types of defects on inspection for an other of the plurality of types of defects;
instructing an inspection apparatus to perform an inspection of the DC power source for at least one of the plurality of types of defects;
obtaining an inspection result from the inspection apparatus of the inspection of the DC power source for the at least one of the plurality of types of defects;
determining, based on the inspection result and the stored defect correlation information for the at least one of the plurality of types of defects, the influence of at least one other of the plurality of types of defects on the inspection result; and
outputting information to guide the inspection apparatus, the output information indicating whether the inspection result is influenced by the at least one other of the plurality of types of defects.

14. The control method according to claim 13, wherein the defect correlation information comprises a validity of the inspection result based on the influence of the at least one other of the plurality of types of defects.

15. The control method according to claim 13, wherein the information indicating whether the inspection result is affected by the at least one other of the plurality of types of defects comprises information guiding the inspection apparatus to inspect for the at least one other of the plurality of types of defects that influences the inspection result of inspecting for the at least one type of defect.

16. The control method according to claim 13, further comprising instructing the inspection apparatus to perform an inspection of the DC power source for the at least one other of the plurality of types of defects influences the inspection result.

17. The control method according to claim 13, further comprising:
storing the inspection result as history information; and
obtaining, from the history information, an inspection result of inspecting another type of defect determined to influence the inspection result of the inspection of the DC power source for the at least one of the plurality of types of defects.

18. The control method according to claim 13, further comprising:
finding for each of the plurality of types of defects, an influence level indicating a level of influence that the type of defect will have on inspections for the other types of the plurality of types of defects, based on the defect correlation information;
setting an order in which to inspect for defects based on the influence levels; and
instructing the inspection apparatus to inspect for the defects based on the order.

* * * * *